United States Patent
Lin (10) Patent No.: US 10,232,217 B1
(45) Date of Patent: Mar. 19, 2019

(54) ELECTRONIC GAGE SUPPORTING STRUCTURE OF EXERCISE APPARATUS

(71) Applicant: BH ASIA LTD., Taichung (TW)

(72) Inventor: Fu Hai Lin, Taichung (TW)

(73) Assignee: BH Asia Ltd., Taichung (TW)

( * ) Notice: Subject to any disclaimer, the term of this patent is extended or adjusted under 35 U.S.C. 154(b) by 0 days.

(21) Appl. No.: 15/709,628

(22) Filed: Sep. 20, 2017

(51) Int. Cl.
| H05K 7/00 | (2006.01) |
| A63B 22/00 | (2006.01) |
| F16B 2/12 | (2006.01) |
| A63B 22/06 | (2006.01) |

(52) U.S. Cl.
CPC ............ *A63B 22/0046* (2013.01); *F16B 2/12* (2013.01); *A63B 22/0605* (2013.01); *A63B 2225/685* (2013.01)

(58) Field of Classification Search
CPC .............................. A47B 23/042; A47B 97/04
USPC ....... 248/313, 316.4, 451, 452, 453, 223.41, 248/295.11, 297.21, 448, 449
See application file for complete search history.

(56) References Cited

U.S. PATENT DOCUMENTS

| 6,398,174 | B1 * | 6/2002 | Emalfarb | A47G 7/044 |
| | | | | 248/214 |
| 9,027,900 | B2 * | 5/2015 | Prohofsky | F16M 11/041 |
| | | | | 248/449 |
| 9,068,690 | B2 * | 6/2015 | Herzog | F16M 11/043 |
| 9,453,522 | B2 * | 9/2016 | Yu | F16M 13/00 |
| 9,776,577 | B2 * | 10/2017 | Carnevali | B60R 11/02 |
| 2012/0257346 | A1 * | 10/2012 | Hulet | H04M 1/04 |
| | | | | 361/679.32 |
| 2014/0042285 | A1 * | 2/2014 | Carnevali | B60R 11/02 |
| | | | | 248/316.4 |
| 2014/0151523 | A1 * | 6/2014 | Subbaraman | B43L 3/008 |
| | | | | 248/449 |

* cited by examiner

*Primary Examiner* — Steven M Marsh
(74) *Attorney, Agent, or Firm* — Rosenberg, Klein & Lee (57) ABSTRACT

An electronic gage supporting structure of an exercise apparatus includes a main body provided with a linearly extending groove track. The groove track is provided with a slidable first positioning member, which can be secured at any position along the groove track by a securing member. The main body is further provided with a second positioning member at a position facing the groove track, and the second positioning member is arranged opposite the first positioning member. The first positioning member has a first side facing the second positioning member and provided with a first positioning groove. The second positioning member has a second side facing the first positioning member and provided with a second positioning groove. The first and the second positioning members define a positioning space therebetween in which an object can be secured, with the object being positioned jointly by the first and the second positioning grooves.

14 Claims, 7 Drawing Sheets

ELECTRONIC GAGE SUPPORTING STRUCTURE OF EXERCISE APPARATUS

BACKGROUND OF THE INVENTION

1. Technical Field

The present invention relates to an exercise apparatus and more particularly to a supporting structure with which to mount an electronic gage to an exercise apparatus.

2. Description of Related Art

Figure 7:
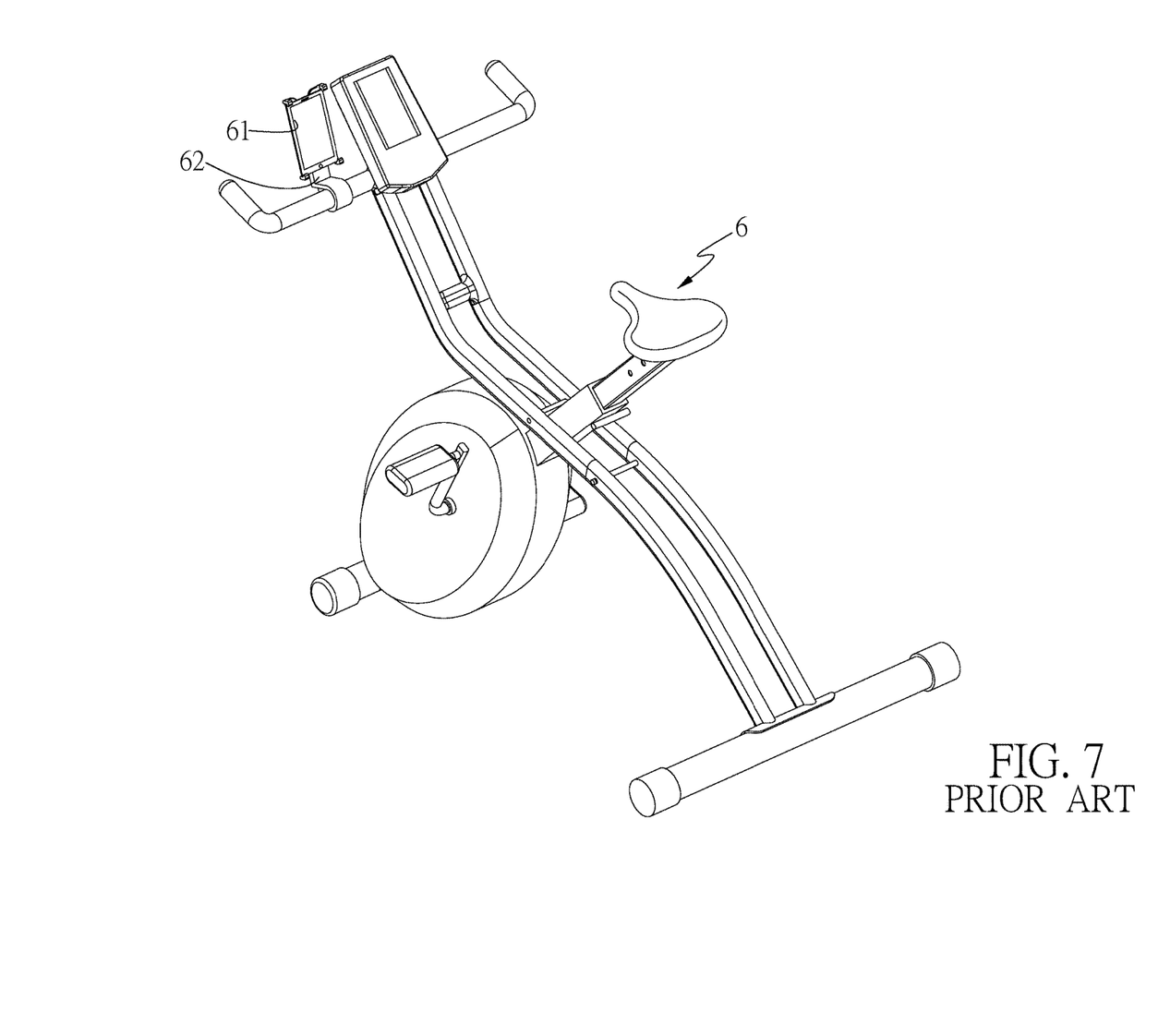
FIG. 7 is a perspective view of a conventional structure.

Many people exercise on a regular basis. Some choose to exercise with indoor exercise apparatuses such as treadmills and stationary bicycles. Some prefer to listen to music from or watch videos on an electronic device while doing exercise. However, as shown in FIG. 7, the conventional exercise apparatus 6 lacks a support to which a mobile electronic device 61 can be secured, making it inconvenient to use the exercise apparatus 6 and the mobile electronic device 61 at the same time. An additional support 62 must be prepared by the user of the mobile electronic device 61 themselves in order to secure the mobile electronic device 61 to the exercise apparatus 6. Furthermore, the mobile electronic device 61 comes in various types, including music players, mobile phones, tablet computers, and so on, each type different from another in size and/or shape. A support 62 of a fixed configuration, therefore, cannot adapt to different mobile electronic devices 61.

BRIEF SUMMARY OF THE INVENTION

The primary objective of the present invention is to provide an electronic gage supporting structure of an exercise apparatus, wherein the supporting structure not only can be mounted with an object (e.g., a mobile electronic device) in addition to the electronic gage, but also is movably adjustable to the size or shape of the object.

To achieve the above objective, the present invention provides an electronic gage supporting structure of an exercise apparatus, wherein the supporting structure includes a main body, a first positioning member, and a second positioning member.

The main body is provided with a connecting portion to be secured to the exercise apparatus. The main body is also provided with a groove track that extends linearly.

The first positioning member is provided with a gage connecting portion to be secured to the electronic gage. The first positioning member is slidably provided on the groove track and can be secured at any arbitrarily selected position along the groove track by a securing member.

The second positioning member is secured on the main body at a position facing the groove track and is arranged opposite the first positioning member. The first positioning member has a first side facing the second positioning member and provided with a first positioning groove. The second positioning member has a second side facing the first positioning member and provided with a second positioning groove. The first positioning member and the second positioning member define a positioning space therebetween in which an object can be secured, with the object being positioned jointly by the first positioning groove and the second positioning groove.

In one embodiment, the second positioning groove of the second positioning member is concavely provided therein with a third positioning groove. The third positioning groove can be used as appropriate to secure the object.

In one embodiment, each of the first positioning groove, the second positioning groove, and the third positioning groove is provided with a pad.

In one embodiment, the groove track is an elongated through hole, and the securing member is a rotary knob extending through the groove track and threadedly provided at the first positioning member in a movable manner. By screwing the rotary knob into the first positioning member, the rotary knob is pressed tightly against the groove track to secure the first positioning member to the groove track.

DETAILED DESCRIPTION OF THE INVENTION

Figure 1:
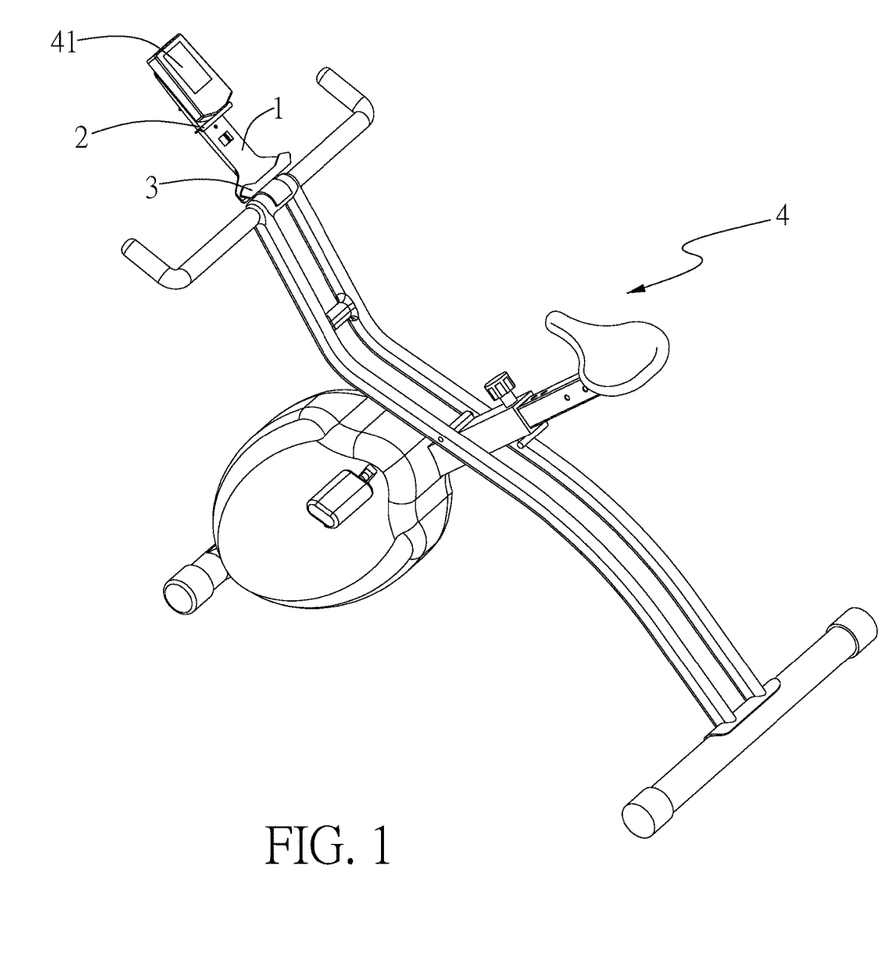
FIG. 1 is a perspective view of the present invention mounted on an exercise apparatus.
Figure 2:
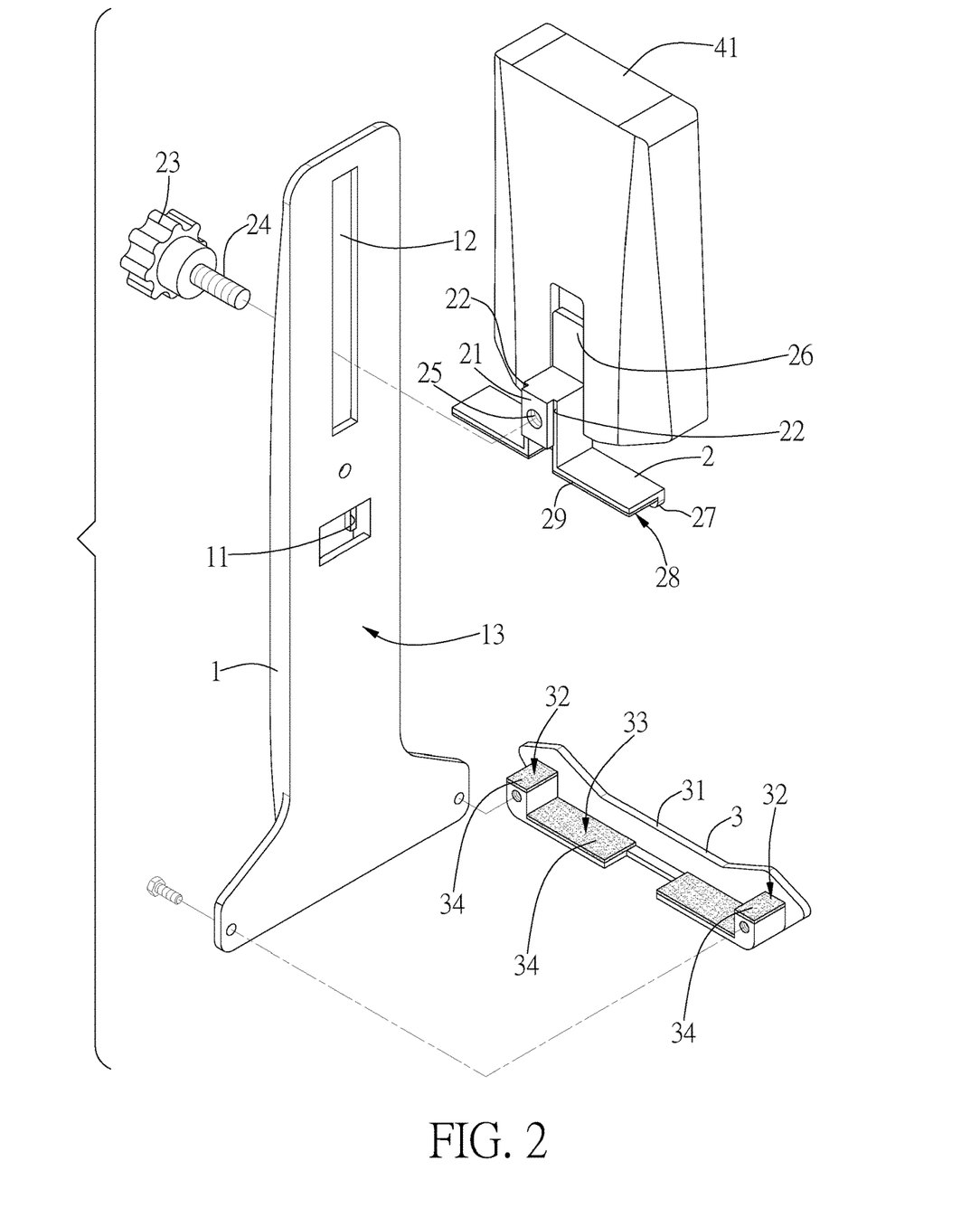
FIG. 2 is an exploded perspective view of the present invention.

Referring to FIG. 1 and FIG. 2, the present invention provides an electronic gage supporting structure of an exercise apparatus 4. The exercise apparatus 4 may be a treadmill, stepper, stationary bicycle, or the like; the present invention has no limitation on its type. The electronic gage supporting structure includes a main body 1. The main body 1 is provided with a connecting portion 11 to be secured to the exercise apparatus 4. The connecting portion 11 may vary in structure without limitation and may be secured to the exercise apparatus 4 by any conventional means.

Figure 3:
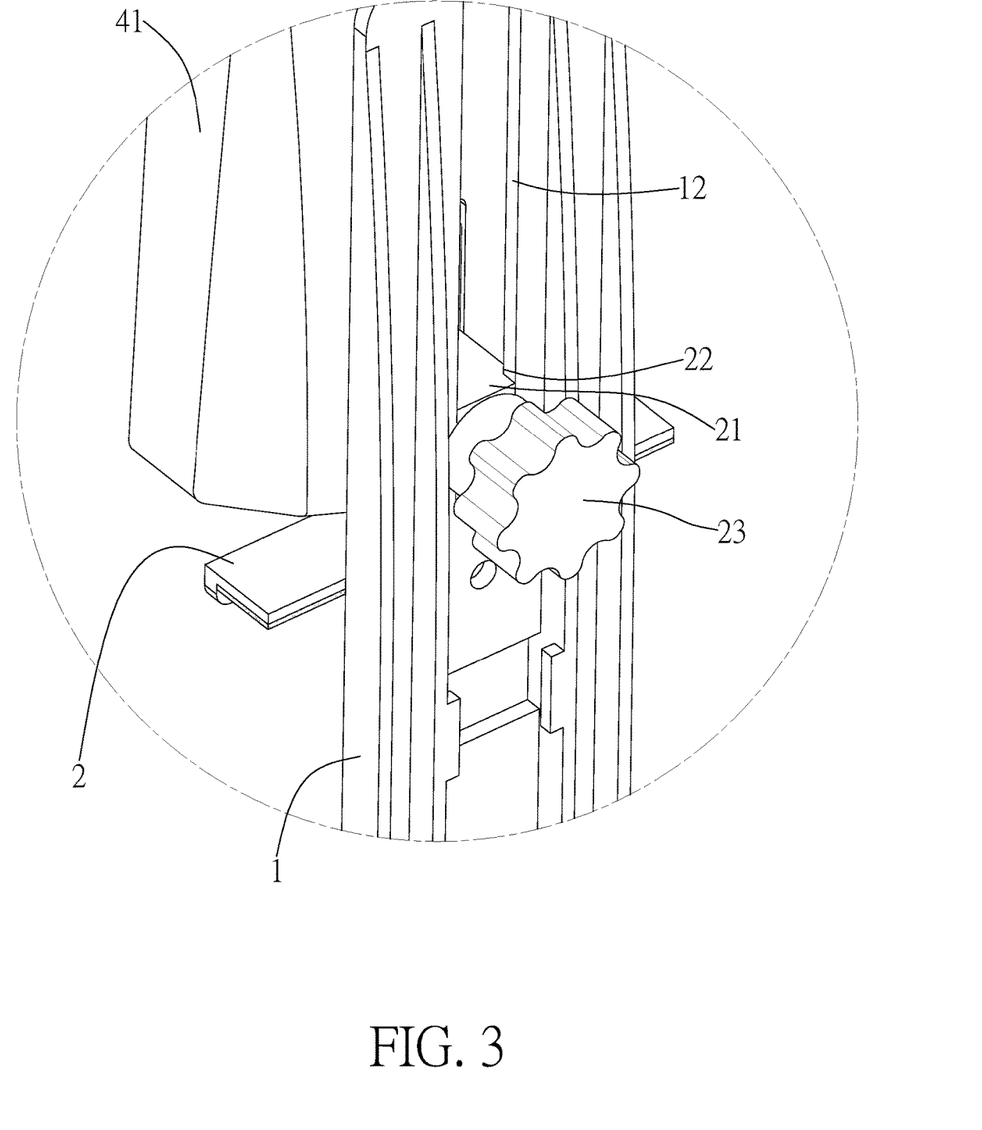
FIG. 3 and FIG. 4 are partial enlarged views of the present invention.

The main body 1 is also provided with a linearly extending groove track 12. In this embodiment, the groove track 12 is an elongated through hole and extends from the top end of the main body 1 to a middle portion of the main body 1. The groove track 12 is provided with a first positioning member 2 that can be slid along the groove track 12. The side of the first positioning member 2 that faces the groove track 12 is provided with a protruding block 21. The protruding block 21 has two opposite lateral sides each formed with a step surface 22. As shown in FIG. 3, the protruding block 21 of the first positioning member 2 is inserted into the through hole of the groove track 12 such that the two step surfaces 22 are pressed against the edge of the groove track 12. In addition, a securing member 23 is structured as a rotary knob and is extended with a threaded rod 24. The threaded rod 24 extends through the groove track 12 and is movably locked into a threaded hole 25 in the first positioning member 2. While the threaded rod 24 is being screwed into the threaded hole 25, the securing member 23 is pressed tightly against the groove track 12, thereby securing the first positioning member 2 to the groove track 12.

The first positioning member 2 is further provided with a gage connecting portion 26 for securing an electronic gage 41 to be connected to the exercise apparatus 4, in order for the electronic gage 41 to display the exercise information of a user of the exercise apparatus 4.

Figure 4:
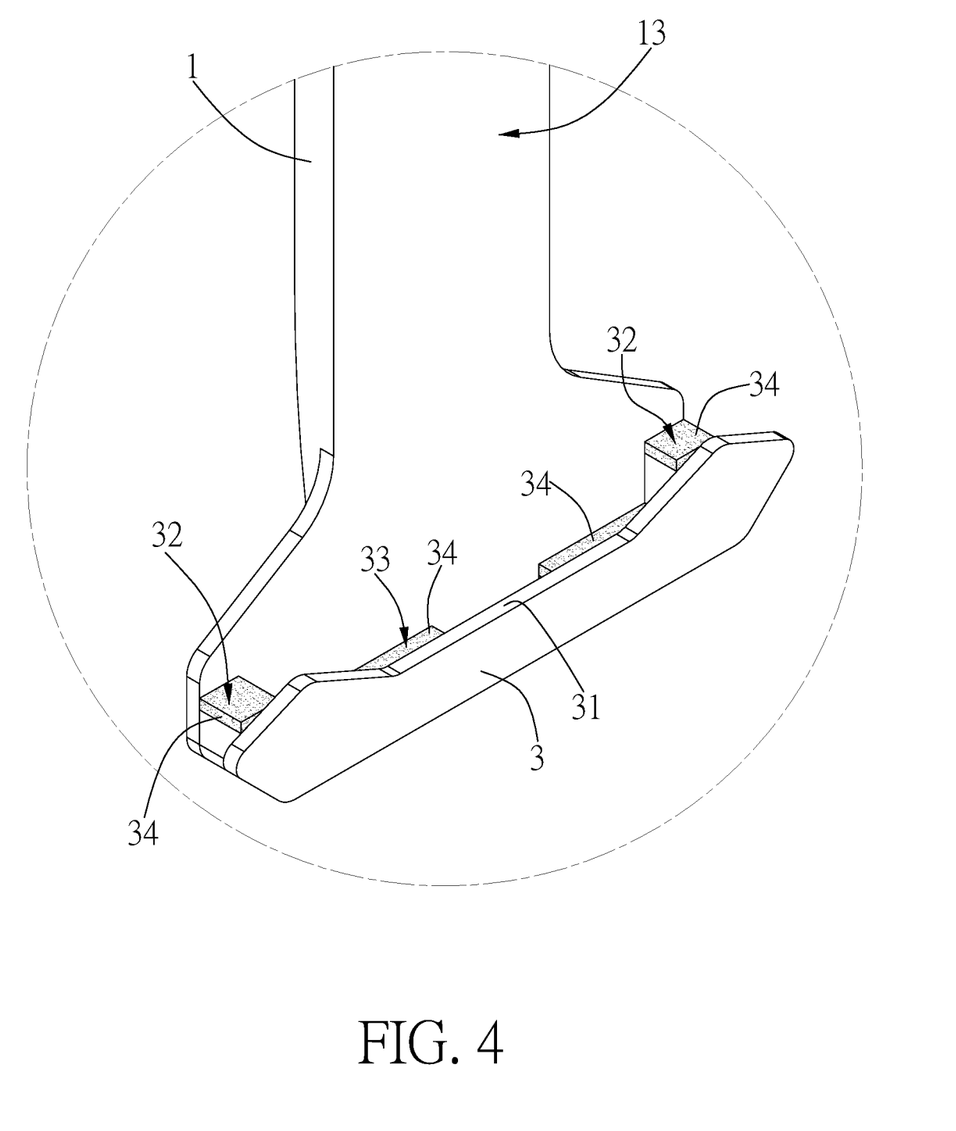

Moreover, referring to FIG. 2 and FIG. 4, the bottom end of the main body 1 is fixedly provided with a second positioning member 3 at a position facing the groove track 12, wherein the second positioning member 3 is arranged opposite the first positioning member 2. The first positioning member 2 has a first side 27 facing the second positioning member 3 and provided with a first positioning groove 28. The second positioning member 3 has a second side 31 facing the first positioning member 2 and provided with a second positioning groove 32. In this embodiment, the second positioning groove 32 is further concavely provided therein with a third positioning groove 33 whose width is smaller than that of the second positioning groove 32. The first positioning member 2 and the second positioning member 3 define a positioning space 13 therebetween. An object such as a mobile electronic device can be secured in the positioning space 13 while being positioned jointly by the first positioning groove 28 and the second or the third positioning groove 32 or 33.

Figure 5:
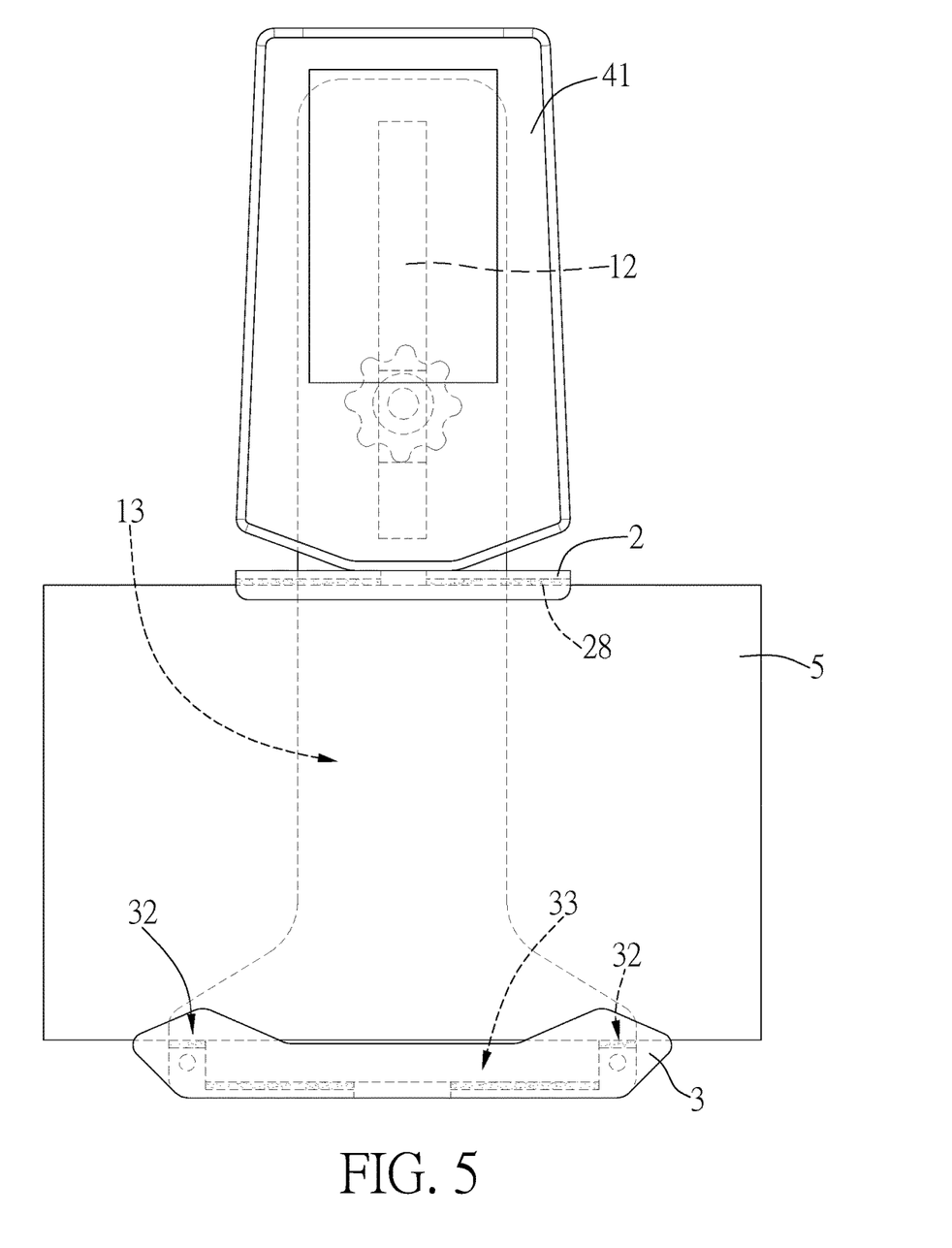
FIG. 5 and FIG. 6 show different states of use of the present invention.
Figure 6:
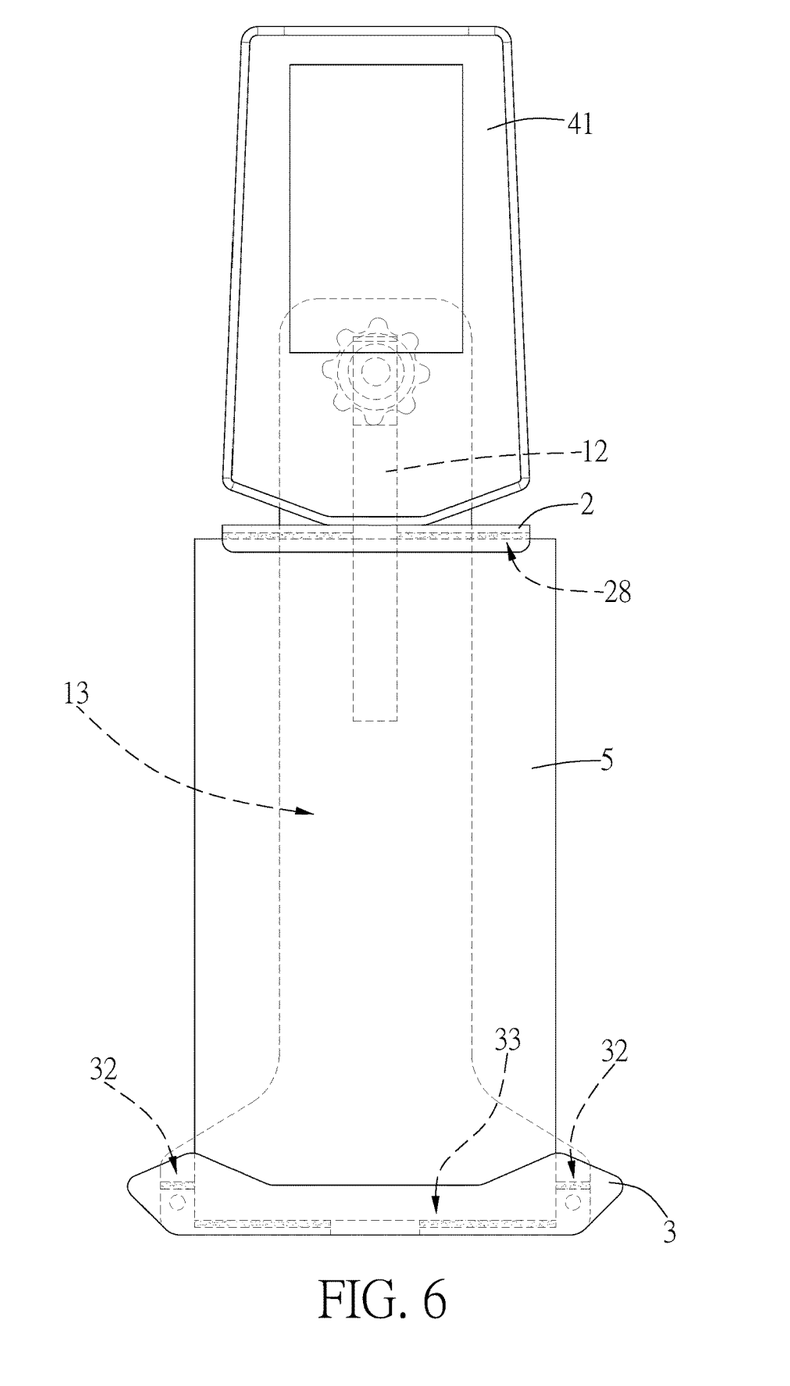

To use the present invention, the connecting portion 11 is secured to the exercise apparatus 4, and the electronic gage 41 is secured to the gage connecting portion 26 of the first positioning member 2 and thereby mounted on the first positioning member 2. After that, an object brought by the user of the exercise apparatus 4 (e.g., the mobile electronic device 5, which may be a music player, mobile phone, tablet computer, or the like) can be mounted in the positioning space 13 between the first positioning member 2 and the second positioning member 3 as shown in FIG. 5 and FIG. 6. More specifically, the lower end of the mobile electronic device 5 is pressed against the second positioning member 3, and then the first positioning member 2 is adjusted along the groove track 12 until pressed tightly against the upper end of the mobile electronic device 5 to secure the mobile electronic device 5 in position. Depending on the shape or orientation of the mobile electronic device 5, the lower end of the mobile electronic device 5 can be positioned in the second positioning groove 32 or the third positioning groove 33. For example, when the mobile electronic device 5 is placed in a landscape orientation as shown in FIG. 5, with the width of its lower end larger than the width of the third positioning groove 33, the lower end of the mobile electronic device 5 can be pressed against the wall of, and thus positioned in, the second positioning groove 32. When the mobile electronic device 5 is placed in a portrait orientation instead, as shown in FIG. 6, with the width of its lower end smaller than or equal to that of the third positioning groove 33, the lower end of the mobile electronic device 5 can be put into and thus positioned in the third positioning groove 33. In either case, the first positioning member 2 can be moved along the groove track 12 according to the position of the upper end of the mobile electronic device 5, in order to press the wall of the first positioning groove 28 tightly against the upper end of the mobile electronic device 5 and thereby secure the mobile electronic device 5.

In this embodiment, referring to FIG. 2, each of the first positioning groove 28, the second positioning groove 32, and the third positioning groove 33 is provided with a pad 29, 34 to protect the object positioned between the first positioning member 2 and the second positioning member 3 from damage.

One major feature of the present invention is that the supporting structure of the electronic gage 41 doubles as a structure for securing other objects (e.g., the mobile electronic device 5), thus adding to the convenience of use of the exercise apparatus 4. Furthermore, the electronic gage 41 of the exercise apparatus 4 generally uses only an LCD screen to display a small amount of simple information, which can be boring due to a lack of multimedia effects (e.g., audio-visual effects). The present invention, on the other hand, can be used to secure a user's mobile electronic device 5 at a position adjacent to the electronic gage 41 so that, if loaded with an application program for communicating with the electronic gage 41, the mobile electronic device 5 can receive information from the electronic gage 41 via Bluetooth or near-field communication (NFC) and present the information with rich multimedia effects to bring about better user experience of the exercise apparatus 4.

What is claimed is:

1. An electronic gage supporting structure of an exercise apparatus, the supporting structure comprising:
   a main body provided with a connecting portion to be secured to the exercise apparatus, the main body being further provided with a linearly extending groove track;
   a first positioning member provided with a gage connecting portion to be secured to an electronic gage for the exercise apparatus, the first positioning member being slidably provided on the groove track and securable at a selected position along the groove track by a securing member; and
   a second positioning member secured on the main body at a position opposite the first positioning member,
   wherein the first positioning member has a first side facing the second positioning member and provided with a first positioning groove, the gage connecting portion of the first positioning member projects away from the first side and is configured to retentively receive the electronic gage thereon, the second positioning member has a second side facing the first positioning member and provided with a second positioning groove, and the first positioning member and the second positioning member define a positioning space therebetween in which an object can be secured, whereby the object is positioned jointly by the first positioning groove and the second positioning groove.

2. The electronic gage supporting structure of claim 1, wherein the second positioning groove of the second positioning member is concavely provided therein with a third positioning groove having a lesser width than the second positioning groove for optional use to secure the object.

3. The electronic gage supporting structure of claim 2, wherein each of the first positioning groove, the second positioning groove, and the third positioning groove is provided with a pad.

4. The electronic gage supporting structure of claim 1, wherein the groove track is an elongated through hole, the securing member is a rotary knob extending through the groove track and threadedly provided at the first positioning member in a movable manner, and by screwing the rotary knob into the first positioning member, the rotary knob is pressed tightly against the groove track to secure the first positioning member to the groove track.

5. An electronic gage structure of an exercise apparatus, the gage structure comprising:
   an electronic gage to be connected to the exercise apparatus;
   a support main body provided with a connecting portion to be secured to the exercise apparatus, the support main body being further provided with a linearly extending groove track;
   a first positioning member provided with a gage connecting portion secured to the electronic gage, the first positioning member being slidably provided on the groove track and securable at a selected position along the groove track by a securing member; and a second positioning member secured on the support main body at a position opposite the first positioning member, wherein the first positioning member has a first side facing the second positioning member and provided with a first positioning groove, the second positioning member has a second side facing the first positioning member and provided with a second positioning groove, and the first positioning member and the second positioning member define a positioning space therebetween in which an object can be secured, whereby the object is positioned jointly by the first positioning groove and the second positioning groove.

6. The gage structure of claim 5, wherein the second positioning groove of the second positioning member is concavely provided therein with a third positioning groove having a lesser width than the second positioning groove for optional use to secure the object.

7. The gage structure of claim 6, wherein each of the first positioning groove, the second positioning groove, and the third positioning groove is provided with a pad.

8. The gage structure of claim 5, wherein the groove track is an elongated through hole, the securing member is a rotary knob extending through the groove track and threadedly provided at the first positioning member in a movable manner, and by screwing the rotary knob into the first positioning member, the rotary knob is pressed tightly against the groove track to secure the first positioning member to the groove track.

9. The gage structure of claim 5, wherein the first positioning groove and the second positioning groove are configured to secure the object adjacent to and aligned with the electronic gage.

10. An exercise structure comprising:

an exercise apparatus;

an electronic gage connected to the exercise apparatus;

a support main body provided with a connecting portion secured to the exercise apparatus, the support main body being further provided with a linearly extending groove track;

a first positioning member provided with a gage connecting portion secured to the electronic gage, the first positioning member being slidably provided on the groove track and securable at a selected position along the groove track by a securing member; and a second positioning member secured on the support main body at a position opposite the first positioning member, wherein the first positioning member has a first side facing the second positioning member and provided with a first positioning groove, the second positioning member has a second side facing the first positioning member and provided with a second positioning groove, and the first positioning member and the second positioning member define a positioning space therebetween in which an object can be secured, whereby the object is positioned jointly by the first positioning groove and the second positioning groove.

11. The exercise structure of claim 10, wherein the second positioning groove of the second positioning member is concavely provided therein with a third positioning groove having a lesser width than the second positioning groove for optional use to secure the object.

12. The exercise structure of claim 11, wherein each of the first positioning groove, the second positioning groove, and the third positioning groove is provided with a pad.

13. The exercise structure of claim 10, wherein the groove track is an elongated through hole, the securing member is a rotary knob extending through the groove track and threadedly provided at the first positioning member in a movable manner, and by screwing the rotary knob into the first positioning member, the rotary knob is pressed tightly against the groove track to secure the first positioning member to the groove track.

14. The exercise structure of claim 10, wherein the first positioning groove and the second positioning groove are configured to secure the object adjacent to and aligned with the electronic gage.

* * * * *